(No Model.)
F. H. RICHARDS.
ENDLESS CONVEYER.
No. 568,586. Patented Sept. 29, 1896.
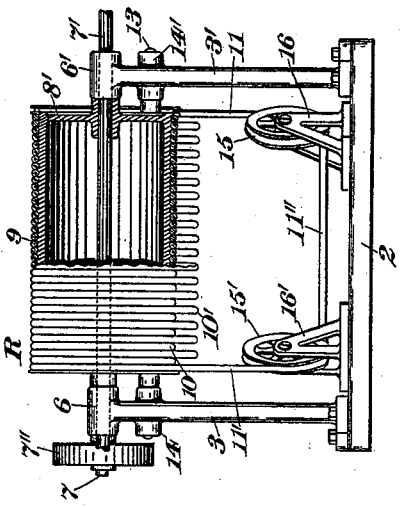
Witnesses:
J. L. Edwards, Jr.
Fred. J. Dole.
Inventor:
F. H. Richards

UNITED STATES PATENT OFFICE.

FRANCIS H. RICHARDS, OF HARTFORD, CONNECTICUT.

ENDLESS CONVEYER.

SPECIFICATION forming part of Letters Patent No. 568,586, dated September 29, 1896.

Application filed June 15, 1896. Serial No. 595,536. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Endless Conveyers, of which the following is a specification.

This invention relates to endless conveyers, and particularly to a conveyer or feeder adapted for feeding granular or fibrous material from a suitable source of supply—such as a hopper or chute—to a vessel or receptacle to be filled.

My improved conveyer is especially designed and intended to control the supply of material fed into the bucket or load-receptacle of an automatic weighing-machine in the manner, for example, shown and described in Letters Patent No. 561,522, granted to me June 2, 1896, although, of course, I do not limit the use of my improved feeder to a weighing-machine or to any special class of apparatus.

One of the main objects of my present invention is to provide an endless conveyer having a floor or carrying-run composed of a multiplicity of strands, preferably of rope, which are contiguous or run in contact with each other, adapted to form a yielding carrier having a good holding-surface; and in the form thereof herein illustrated a single continuous band or rope is wound around a pair of rotary carriers to form such endless conveyer, and the extreme opposite ends of the continuous band are united and guided in a suitable manner to avoid interference with the two runs of the feeder or endless belt.

In the drawings accompanying and forming part of this specification, Figure 1 is a sectional side elevation of an endless conveyer or feeder constructed in accordance with my present invention and in operative relation with suitable means for feeding a supply of material thereto. Fig. 2 is a plan of the same with the supply chute or hopper removed; and Fig. 3 is a sectional end elevation of the conveyer mechanism shown in Fig. 2, looking from the right hand in said figure.

Similar characters designate like parts in all the figures of the drawings.

My present invention contemplates, broadly, the provision, in combination with a chute or suitable source of supply and with a pair of rotary carriers, of an endless conveyer or feeder adapted to travel around said carriers and to be driven by one of them and positioned to receive a supply of material from the chute or source of supply, the conveyer comprising a multiplicity of strands having their material-supporting runs contiguous to one another.

Any suitable frame may be employed for carrying my improved conveyer, and in the form thereof herein shown I have illustrated this frame embodying a base-plate 2 and a pair of open parallel side frames or uprights 3 and 3', secured to the base 2 in the usual manner by means of bolts. These side frames are preferably connected at their upper sides by means of a flat bed or table 4, disposed directly below the upper run of the conveyer and close to the mouth of the supply-chute or hopper, which is represented at H, for feeding a supply of material on the moving belt. At the opposite ends thereof the side-frames 3 and 3' are shown having bearings 5 and 5' and 6 and 6' for supporting a pair of rotary carriers, which in the present case are illustrated each comprising a shaft and a drum or reel. The shafts are designated, respectively, by 7 and 7' and the drums by 8 and 8', the former of said drums or reels constituting in the present instance the driver and the latter the follower, it being understood that the shaft 7 will be rotated from any suitable source of power—as, for instance, by a belt passing over a pulley 7'' thereon.

The conveyer or feeder is, as before stated, in the nature of an endless traveling belt or band, and is made up of a multiplicity of strands, the upper runs of which are contiguous, the strands of the upper run being indicated herein by 9 and those of the lower or return run by 10 and 10'.

For the purpose of more positively controlling the movements of the separate strands or portions which make up the material-carrying floor I prefer to form the endless belt by winding around the drums 8 and 8' a continuous band or rope (designated herein in a general way by R), the strands or coils of which lie side by side, and are wound from one end of one drum to the opposite end of the other drum, and are then connected in some suitable manner, which will be hereinafter more particularly referred to.

Although the continuous strands or coils of the belt are, it will be understood, wound closely together so as to form a substantial, solid material-receiving floor, as shown in Figs. 2 and 3, yet it will be apparent that when the conveyer is employed to feed forward granular material, the mass or portions of which are in a fine state of comminution, some of the finely-divided material will usually sift through between the contiguous strands or coils and will fall on the inner side of the lower or return run of the conveyer. For this reason I prefer to employ an endless feeder having interstitial openings in its return-run. These openings may be provided in any desired way, but are preferably formed by carrying the return-runs of a plurality of the strands of the conveyer out of and below the normal path of the return-run of the feeder, as shown in Figs. 1 and 3, the lower run of said conveyer being illustrated therein as having alternate return-runs of said coils or strands out of the normal path of the return-run of the belt and dropped below such path, so that whatever material sifts down upon the upper sides of the strands or coils of the lower run of the feeder will fall off from the rope and through the interstitial openings to the floor or into a suitable receiving vessel.

The strands which are depressed to form the openings in the lower run of the belt are illustrated at 10', carried under corresponding guide rollers or sheaves 12, a series of which is shown rotatively carried by a shaft 13, supported at its ends in journals 14 and 14' near the centers of the side frames 3 and 3'. This shaft and the sheaves thereof lie within the conveyer, the peripheries of the sheaves extending a distance below the normal path of the return-run of the belt sufficient to permit the strands 10' to be lowered and carried in such position to form the openings thereamong.

The extreme diagonally opposite ends of the continuous rope or band R are represented herein carried down below the drums and around a pair of sheaves 15 and 15', which constitute means for guiding the rope and are illustrated supported on brackets 16 and 16', secured to the base 2, the ends 11 and 11' of the rope being shown connected at 11'' to form a continuous traveling band.

It will be obvious that the sheaves 15 and 15' constitute means for guiding such connecting portion of the rope and that they are rotatable in one of the diagonal planes of the conveyer as the rope is carried across from one corner of the feeder to that diagonally opposite in a direct line and in such diagonal plane.

It will be obvious from the foregoing description of my improved conveyer or feeder that it will be preferable to form the same from a continuous band or rope wound around the drums in a multiplicity of coils contiguous to one another, as in such construction the coils will readily accommodate themselves to changes in tension—due either to the weight of the mass supported on the upper run of the feeder or to the stretching of the continuous rope—and hence any excessive slack or strain upon any one or more of the coils will be quickly compensated for by the yielding of successive adjacent connected coils of the series which make up the conveyer.

An endless conveyer constructed in the manner hereinbefore described has many advantages over one formed from a single piece of wide material, not the least of which are due to the extreme simplicity of the device and to the facility with which it accommodates itself to varying conditions.

As is obvious, the conveyer need not necessarily be of the endless kind; and I consider as within the scope of my invention any movable conveyer the material-supporting surface of which is composed of a series of contiguous strands.

Having described my invention, I claim—

1. A conveyer or feeder comprising a multiplicity of strands, each of which is in contact with the other.

2. The combination with a supply-chute and with a pair of rotary carriers, of an endless conveyer or feeder mounted on said carriers and in position to receive material from said chute and comprising a continuous band wound around said rotary carriers and forming a multiplicity of coils having their carrying-runs contiguous; and means for actuating one of said rotary carriers.

3. The combination with a supply-chute and with a pair of rotary carriers, of an endless conveyer or feeder mounted on said carriers and in position to receive material from said chute and having interstitial openings in its return-run and comprising a multiplicity of strands having their carrying-runs contiguous; and means for actuating one of said rotary carriers.

4. The combination with a supply-chute and with a pair of rotary carriers, of an endless conveyer or feeder mounted on said carriers and in position to receive material from said chute and comprising a multiplicity of strands having their carrying-runs contiguous and having the return-runs of a plurality of said strands out of the normal path of the return-run of the conveyer to thereby form interstitial openings in said return-run of the conveyer; and means for actuating one of said rotary carriers.

5. The combination with a supply-chute and with a pair of rotary carriers, of an endless conveyer or feeder mounted on said carriers and in position to receive material from said chute and comprising a multiplicity of strands having their carrying-runs contiguous and having alternate return-runs of a plurality of said strands carried under the guide-rollers; a series of guide-rollers in position and adapted to carry said alternate return-runs below the normal path of the return-run of the conveyer to thereby form interstitial openings in said return-run of the conveyer; and means for actuating one of said rotary carriers.

6. The combination with a supply-chute and with a pair of rotary carriers, of an endless conveyer or feeder mounted on said carriers and in position to receive material from said chute and having interstitial openings in its return-run and comprising a continuous rope wound around said rotary carriers and forming a multiplicity of coils having their carrying-runs contiguous; and means for actuating one of said rotary carriers.

7. The combination with a supply-chute and with a pair of rotary carriers, of an endless conveyer or feeder mounted on said carriers and in position to receive material from said chute and having interstitial openings in its return-run and comprising a continuous band wound around said rotary carriers and forming a multiplicity of coils beginning at one end of one carrier and ending at the opposite end of the other carrier and having their carrying-runs contiguous and having said ends of the coils connected outside the runs of the conveyer; means for guiding the said connecting portion of the endless band; and means for actuating one of said rotary carriers.

8. The combination with a supply-chute and with a pair of rotary carriers, of an endless conveyer or feeder mounted on said carriers and in position to receive material from said chute and having interstitial openings in its return-run and comprising a continuous band wound around said rotary carriers and forming a multiplicity of coils beginning at one end of one carrier and ending at the opposite end of the other carrier and having their carrying-runs contiguous and having said ends of the coils carried diagonally across the conveyer and connected outside of the runs thereof; guide-rollers rotatable in said diagonal plane of the conveyer and carrying said connecting portion of the endless band; and means for actuating one of said rotary carriers.

FRANCIS H. RICHARDS.

Witnesses:
FRED. J. DOLE,
HEATH SUTHERLAND.